United States Patent
Matsunobu et al.

[11] Patent Number: 6,034,459
[45] Date of Patent: Mar. 7, 2000

[54] PERMANENT MAGNET TYPE DYNAMO ELECTRIC MACHINE AND ELECTRIC VEHICLE USING THE SAME

[75] Inventors: Yutaka Matsunobu, Hitachi; Fumio Tajima, Juou-machi; Shouichi Kawamata, Hitachi; Takashi Kobayashi, Hitachioota; Suetaro Shibukawa, Hitachinaka; Osamu Koizumi, Ibaraki-machi, all of Japan

[73] Assignee: Hitachi, Ltd., Japan

[21] Appl. No.: 09/292,750

[22] Filed: Apr. 16, 1999

[30] Foreign Application Priority Data

Apr. 16, 1998 [JP] Japan .................. 10-106448

[51] Int. Cl.$^7$ ............... H02K 21/12; H02K 21/14
[52] U.S. Cl. ............................ 310/156; 310/261
[58] Field of Search ...................... 310/156, 261

[56] References Cited

U.S. PATENT DOCUMENTS

| | | | |
|---|---|---|---|
| 4,672,253 | 6/1987 | Tajima et al. | 310/269 |
| 5,233,250 | 8/1993 | De Filippis | 310/156 |
| 5,811,904 | 9/1998 | Tajima et al. | 310/156 |
| 5,886,440 | 3/1999 | Hasebe et al. | 310/156 |
| 5,910,691 | 6/1999 | Wavre | 310/12 |
| 5,936,322 | 8/1999 | Yamaguchi et al. | 310/156 |

FOREIGN PATENT DOCUMENTS

| | | |
|---|---|---|
| 63-310357 | 12/1988 | Japan . |
| 7-336808 | 12/1995 | Japan . |
| 8-223832 | 8/1996 | Japan . |

*Primary Examiner*—Clayton LaBalle
*Attorney, Agent, or Firm*—Evenson, McKeown, Edwards & Lenahan, P.L.L.C.

[57] ABSTRACT

A permanent magnet type dynamoelectric machine for driving a motor vehicle has a stator with a stator iron core and a rotor with a rotor iron core facing the stator iron core through an air gap permitting rotation of the rotor. A plurality of permanent magnets are embedded along the circumference of the rotor iron core. The mechanical angle θ formed about an axial center by the outer circumferential width of a side of each of the permanent magnets which face the stator is set to, $$\theta = n \times \tau_s + 16/P$$

wherein $\tau_s$ is the slot pitch of the stator 1 in mechanical angle, P is number of poles of the dynamoelectric machine and n is an integer.

5 Claims, 7 Drawing Sheets

PERMANENT MAGNET TYPE DYNAMO ELECTRIC MACHINE AND ELECTRIC VEHICLE USING THE SAME

BACKGROUND OF THE INVENTION

This application claims the priority of Japanese patent document 10-106448, filed Apr. 16, 1998, the disclosure of which is expressly incorporated by reference herein.

The present invention relates to a permanent magnet type dynamoelectric machine in which a plurality of permanent magnets are buried or embedded along the circumference in a rotor thereof, and to an electric vehicle using such a permanent magnet type dynamoelectric machine.

A permanent magnet type dynamoelectric machine which is intended to reduce a cogging torque induced therein, JP-A-7-336808 (1995) discloses an arrangement for controlling and reducing cogging torque in such a permanent magnet type dynamo electric machine, by generating a torque for canceling out the cogging torque. Another measure for reducing such cogging torque is disclosed in JP-A-8-223832 (1996) in which a plurality of permanent magnets embedded in a laminated rotor iron core for the dynamoelectric machine are skewed with respect to the axial direction of the laminated rotor iron core.

Since, however, it is difficult to skew already shaped permanent magnets in the laminated rotor iron core, JP-A-8-223832 (1996) uses permanent magnets which are molded by injecting a resin containing powders of magnetic material while skewing the same, to reduce a cogging torque.

However, it is difficult to obtain molded resin type magnets having a uniform performance; and in addition, the cost of such magnets is high. Therefore, it is desirable to use already shaped magnets instead of such molded resin type magnets. In view of the difficulty of skewing the already shaped magnets as described above, it is desirable to devise a measure without skewing the same to reduce the cogging torque.

SUMMARY OF THE INVENTION

In view of the above, an object of the present invention is to provide a permanent magnet type dynamoelectric machine which permits a reduction of cogging torque induced therein, without skewing previously formed magnets, and to provide an electric vehicle using the same.

To achieve the above object, the permanent magnet type dynamoelectric machine according to the present invention comprises a stator including a stator iron core in which a stator winding is wound, and a rotor including a rotor iron core facing the stator iron core through an air gap, permitting rotation thereof. A plurality of permanent magnets are buried along the circumference of the rotor iron core. The (mechanical) angle θ subtended by the outer circumferential width of one of a plurality of permanent magnets embedded in the rotor iron core (at the side of the magnet which faces the stator) is set as, $$\theta \approx n \times \tau_s + 16/P$$

wherein $\tau_s$ (mechanical angle) is a slot pitch of the stator, P is the number of poles the dynamoelectric machine and n is an integer.

According to another embodiment of the invention, the mechanical angle θ formed by the outer circumferential width of each of the permanent magnets (at the side of the magnets which faces the stator), relative to the axial center of the rotor, is set as 32° (assuming that the number of slots of the stator is 48, the slot pitch of the stator in mechanical angle is therefore 7.5°, and the number of poles of the dynamoelectric machine is 8.

Still further, the present invention provides an electric vehicle which comprises a battery for supplying a DC voltage, an invertor which inverts the supplied DC voltage to an AC voltage, and a permanent magnet type dynamoelectric machine which outputs a driving torque for the electric vehicle with the inverted AC voltage. The permanent magnet type dynamoelectric machine comprises a stator having an iron core in which a stator winding is wound, and a rotor including a rotor iron core facing the stator iron core through an air gap, and permitting rotation thereof, and having a plurality of permanent magnets buried along the circumference thereof. According to the invention, the mechanical angle e formed by the outer circumferential width of each of the permanent magnets (at the side facing the stator), with respect to the axial center of the rotor, is set as, $$\theta \approx n \times \tau_s + 16/P$$

wherein $\tau_s$ is a slot pitch of the stator in mechanical angle, P is the number of poles of the dynamoelectric machine and n is an integer. The permanent magnet type dynamoelectric machine according to the invention outputs a predetermined driving torque and either a wheel or a wheel driving shaft of the electric vehicle is directly driven by the predetermined output driving torque.

DETAILED DESCRIPTION OF THE EMBODIMENTS

Hereinbelow, embodiments of the permanent magnet type dynamoelectric machine and the electric vehicle using the same according to the present invention are explained with reference to the drawings.

Figure 1:
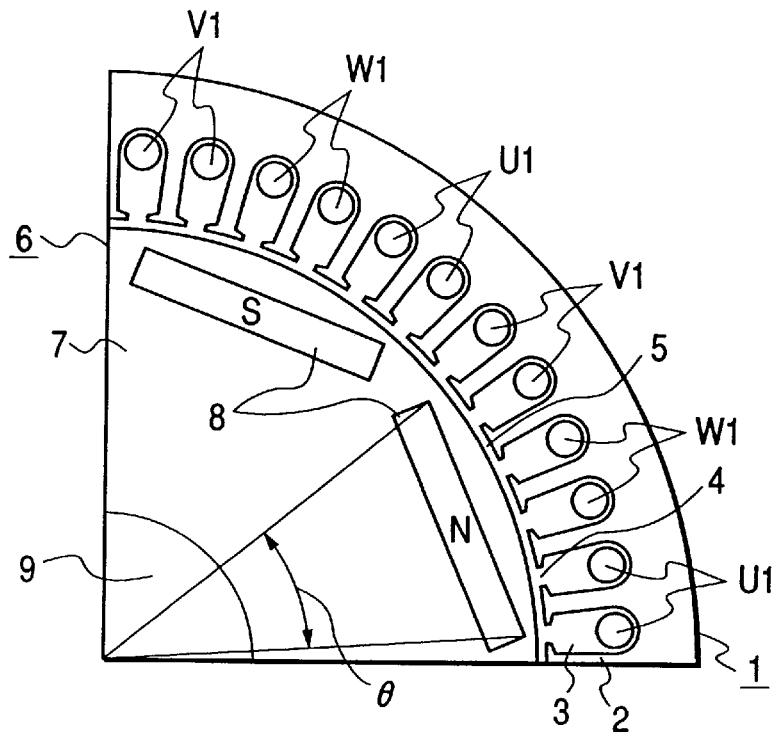
FIG. 1 is a cross sectional view of a quarter of a permanent magnet type dynamoelectric machine representing a first embodiment according to the present invention.

FIG. 1 shows a pair of poles of a three phase permanent magnet type dynamoelectric machine having eight poles and forty eight slots representing a first embodiment according to the present invention. The structure of a stator 1 shown in FIG. 1 is substantially identical to a conventional stator. Forty-eight slots 3 are formed along the inner circumference of a stator iron core 2 having a substantially annular configuration, and stator windings U1, V1 and Wi for respective phases U, V and W are inserted and disposed therein. On the inner circumference of the stator iron core 2, openings corresponding to each of the respective slots 3 are formed.

On the other hand, the rotor 6 includes an iron core 7 fitted and secured on a rotor shaft 9, and a plurality of permanent magnets 8 made of neodymium alloy and magnetized alternatively between N pole and S pole. The magnets are inserted in the axial direction and assembled in respective receiving portions formed by punching along the outer circumference of the rotor iron core 7.

The outer circumference of the rotor iron core 7 faces the inner circumference of the stator iron core 2 with a predetermined air gap 5, so as to permit rotation of the rotor 6. The rotor iron core 7 is constituted by laminating a multiplicity of silicon sheets each having a plurality of punched holes for forming the plurality of the permanent magnet receiving portions.

It has been determined that in a permanent magnet type dynamoelectric machine, when the angle θ formed by the cross sectional outer circumferential width of each of the permanent magnets 8 (in a plane perpendicular to the rotor shaft 9) with respect to the center axis of the rotor shaft 9 is varied, the cogging torque also varies.

Figure 2:
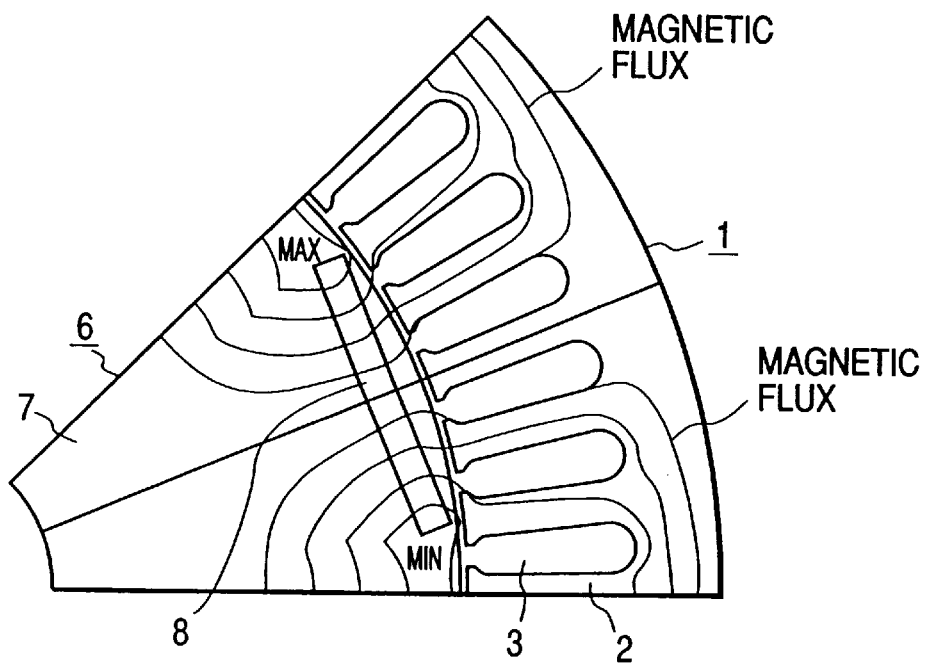
FIG. 2 is a partial cross sectional view of FIG. 1 illustrating magnetic flux distribution used for analysis when the angle θ in FIG. 1 is set at 32°.
Figure 3:
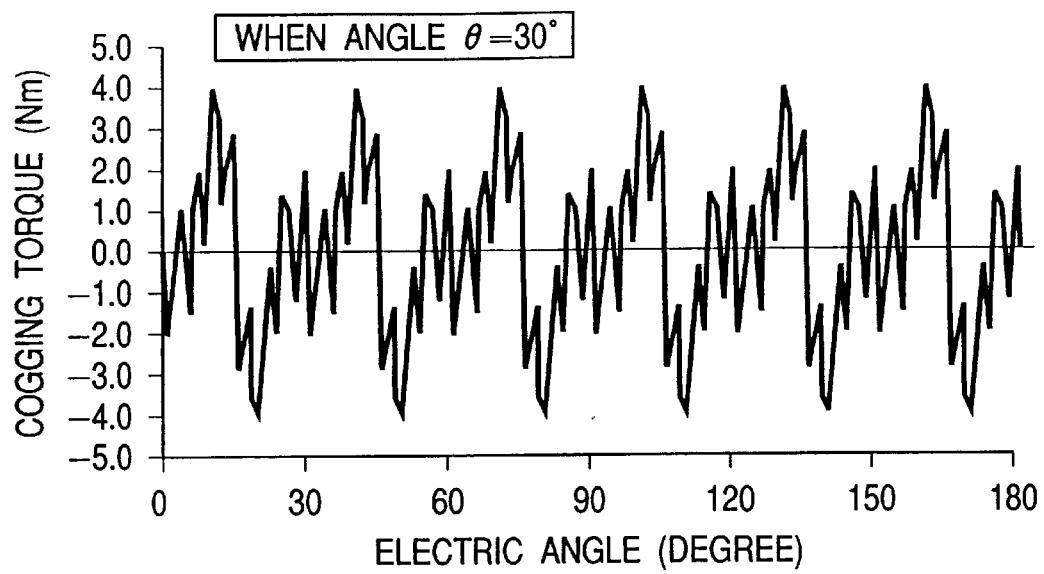
FIG. 3 is a graph illustrating cogging torque with respect to electric angle when the angle θ in FIG. 1 is set at 30°.
Figure 4:
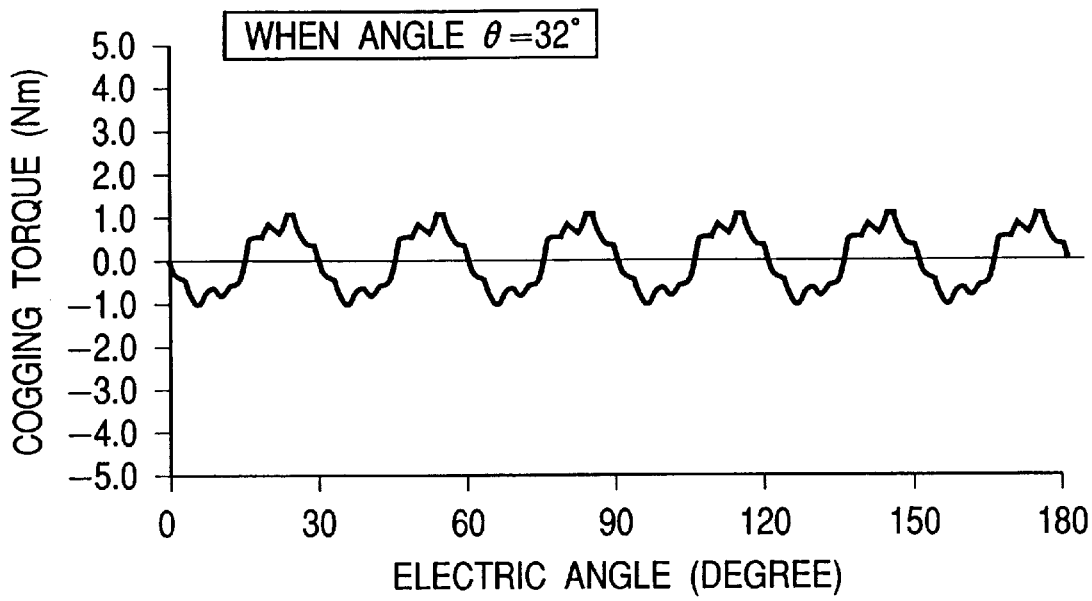
FIG. 4 is a graph illustrating cogging torque with respect to electric angle when the angle θ in FIG. 1 is set at 32°.
Figure 5:
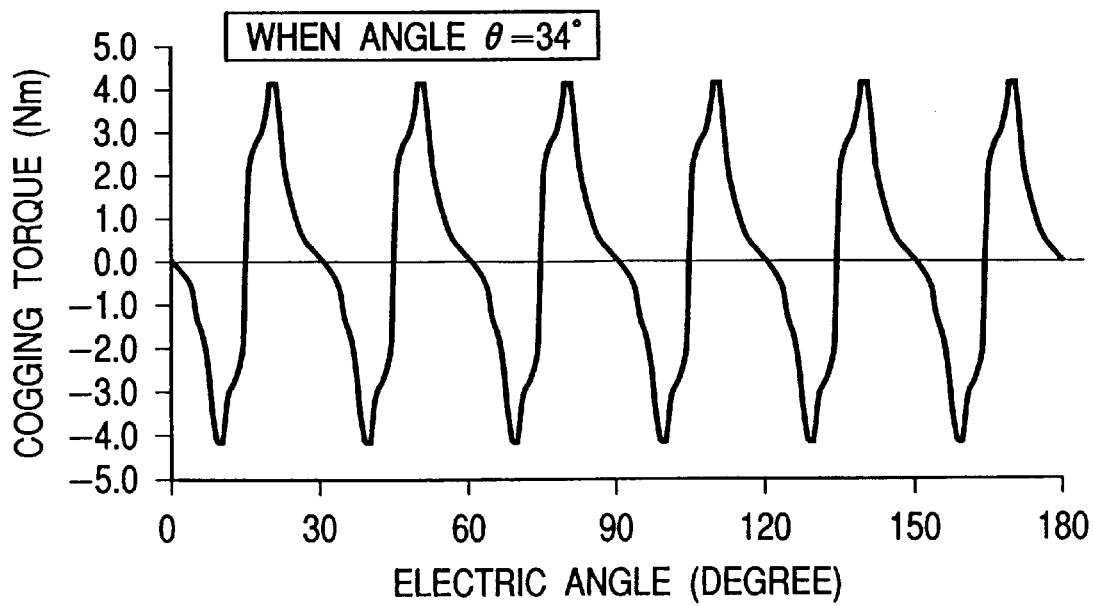
FIG. 5 is a graph illustrating cogging torque with respect to electric angle when the angle θ in FIG. 1 is set at 34°.

FIG. 2 shows a magnetic flux distribution used for analysis when the angle θ is set at 32° for the permanent magnet type dynamoelectric machine as shown in FIG. 1 and having a rated output of 50 KW. FIGS. 3 through 5 show respective waveforms which represent cogging torque (with respect to electrical angles) when the angle θ is set respectively at 30°, 32° and 34°.

Comparing cogging torques shown in FIGS. 3 through 5, it will be observed that the cogging torque is minimized when the angle θ is set at 32°. When the angle θ is set at 30° as shown in FIG. 3, higher harmonic components are clearly visible, and when the angle θ is set at 34°, higher harmonic components are predominant because of large wave distortion of the cogging torque.

Resultantly, when the angle θ is set at 32° wherein the cogging torque includes only a waveform corresponding to the fundamental component having an electric angle period of 30°), the cogging torque is greatly reduced. This is because in a buried permanent magnet type dynamoelectric machine such as the present invention, in which there is a 0.3–0.5 mm air gap for permitting rotation of the rotor and 1–2 mm rotor iron core thickness between the outer circumference thereof and each of the buried permanent magnets, the optimum angle 32° where the cogging torque is minimized is somewhat shifted from the theoretical angle $\theta = n \times \tau_s$ at which the cogging torque is minimized.

Figure 6:
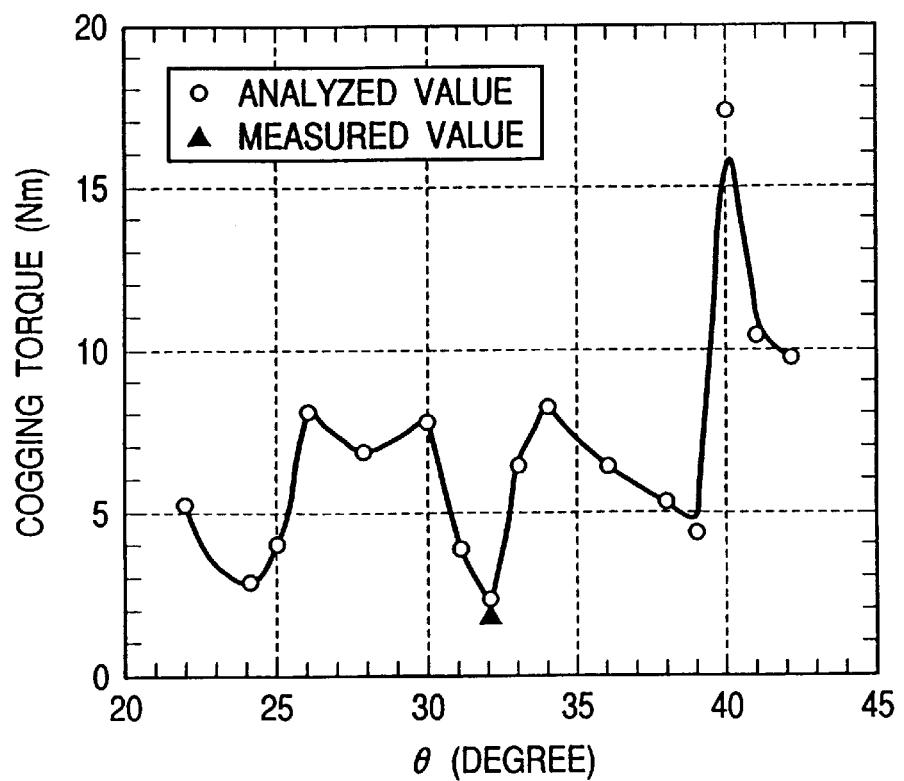
FIG. 6 is a graph illustrating analyzed values of peak to peak cogging torques when the angle θ in FIG. 1 is varied and a measured value thereof when the angle θ is 32°.

FIG. 6 shows analyzed values of peak to peak cogging torques as a function of the angle θ, and a measured value of cogging torque when the angle θ is 32°. It will be appreciated that the validity of the present analysis is confirmed because the measured value and the analyzed value of respective cogging torques correctly agree each other at the angle θ=32° as seen from FIG. 6. The cogging torques are small at angles θ=24°, 32° and 39° which angles agree within errors of ±1° to angles 24.5°, 32° and 39.5° determined by a slot pitch $(\tau_s = 7.5°) \times n + 16/P$, wherein n represents an integer and P represents the number of poles. (In the present embodiment P is 8.)

Thus, it is confirmed that when the angle θ is set under the following relation:

$$\theta \approx n \times \tau_s + 16/P$$

the cogging torque is reduced.

Figure 7:
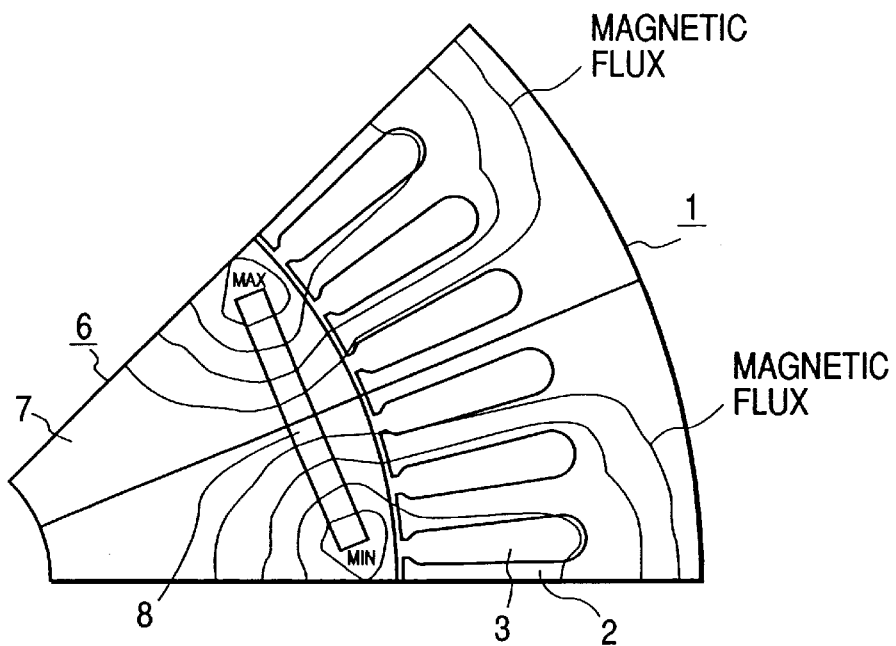
FIG. 7 is a similar view as with FIG. 2, but for another permanent magnet type dynamoelectric machine having different radius, laminated iron core thickness and rated output from those shown in FIG. 1.
Figure 8:
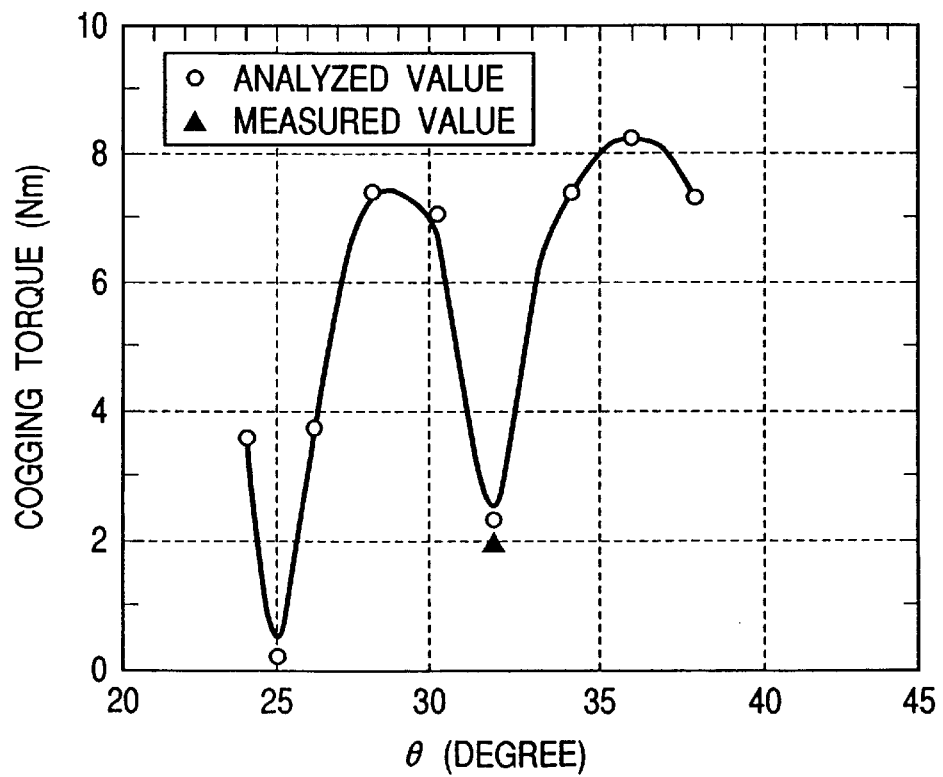
FIG. 8 is a graph illustrating analyzed values of peak to peak cogging torques when the angle θ in FIG. 7 permanent magnet type dynamoelectric machine is varied, and a measured value thereof when the angle θ is 32°.

Further, in order to confirm the general applicability of the foregoing reducing method of reducing cogging torque by adjusting the above defined angle θ, another magnetic flux analysis was performed on a different permanent magnet type dynamoelectric machine having a rated output of 62 KW and different radius and laminated iron core thickness from those shown in FIG. 1. FIG. 7 shows the magnetic field distribution used for the analysis and FIG. 8 shows analyzed values of peak to peak cogging torques as a function of the angle θ, and a measured value thereof when the angle θ is 32°. It will be appreciated that in FIG. 8 both the measured value and the analyzed value of the cogging torque at the angle θ=32° also coincide well with each other.

As seen from FIG. 8, the cogging torques at the angle θ=25° and 32° are small. For the present permanent magnet type dynamoelectric machine concerned, these two angles at least agree to values 24.5° and 32° determined by nx slot pitch $\tau_s$ (=7.5°)+16/P (wherein P is number of poles and in the present example 8) within an error of ±1°.

Figure 9:
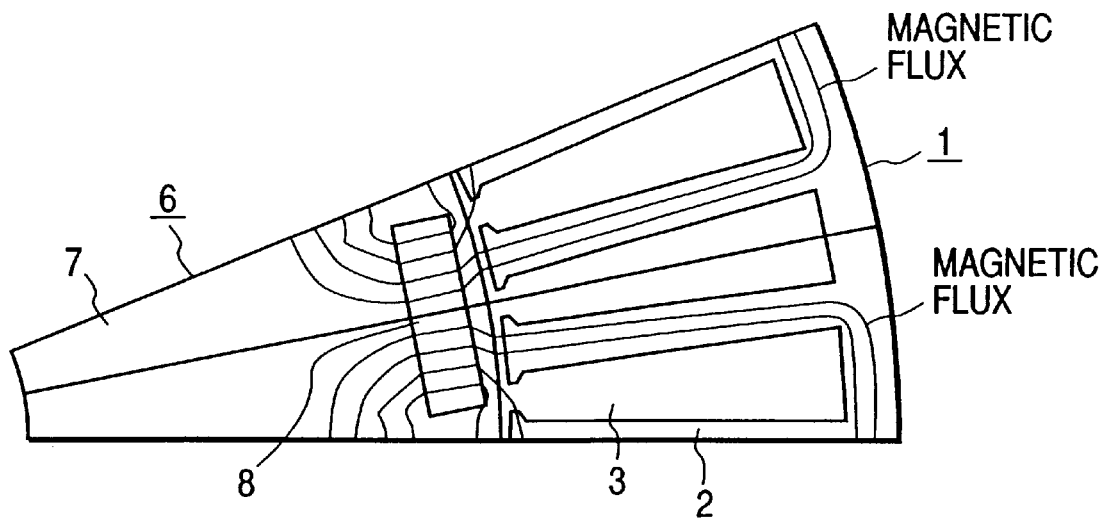
FIG. 9 is a similar view as with FIG. 2 but for still another permanent magnet type dynamoelectric machine having 16 poles.

Further, analysis was performed for still another permanent magnet type dynamoelectric machine having 16 poles. FIG. 9 shows magnetic field distribution used for the analysis and FIG. 10 shows analyzed values of peak to peak cogging torques as a function of the angle θ.

Figure 10:
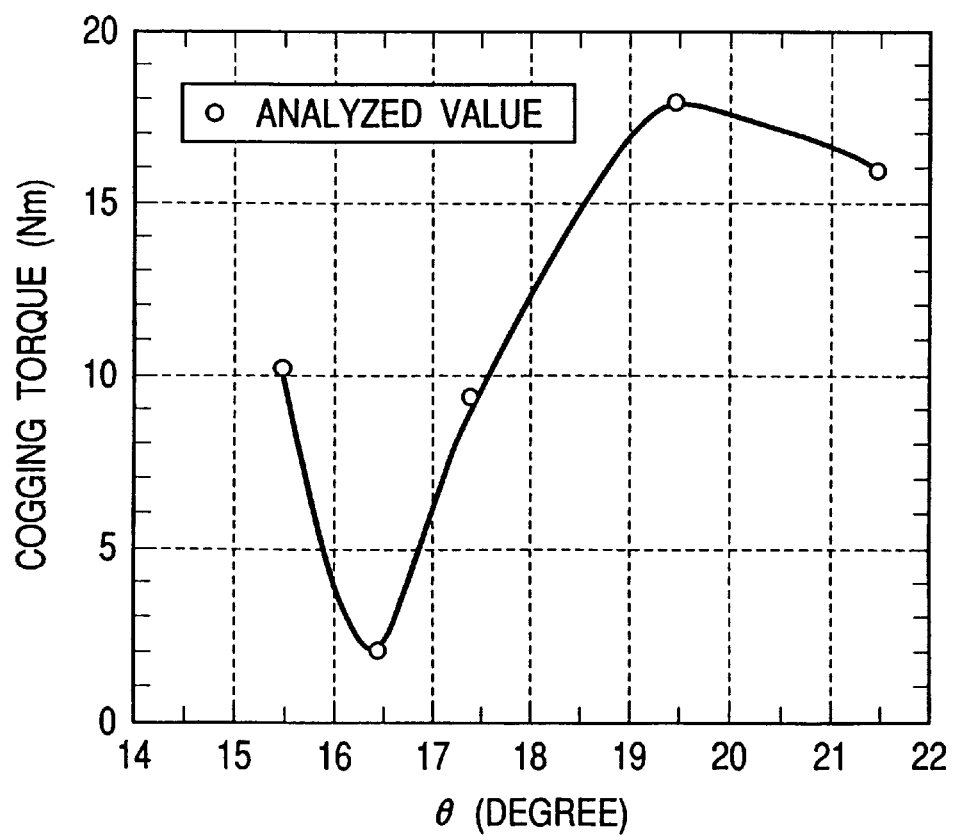
FIG. 10 is a graph illustrating analyzed values for peak to peak cogging torques when the angle θ in FIG. 9 permanent magnet type dynamoelectric machine is varied.

As seen from FIG. 10, the cogging torque at the angle θ=16.5° is small. Once again, for the present permanent magnet type dynamoelectric machine, this angle θ=16.5° at least agrees to the value 16° determined by nx slot pitch $\tau_s$ (=7.5)+16/P (wherein P is number of poles of the machine and in the present example 16) within an error of ±1°.

Now, the driving torque T of a permanent magnet type dynamoelectric machine is expressed as follows $$T = \phi I_q + (L_q - L_d) I_q \times I_d,$$

wherein the that magnetic flux density induced by the permanent magnets is φ, q axis inductance of the machine is Lq, d axis inductance thereof is Ld, q axis winding current thereof is Iq and d axis winding current thereof is Id.

In the above equation, the first term on the right side relates to a torque induced by the main flux of the permanent magnets, and the second term relates to the reluctance torque induced by the rotor member between two adjacent permanent magnets, namely, an auxiliary salient pole. The values of the first and second terms depend on respective circumferential covering angles of the permanent magnet and the auxiliary salient pole in the rotor, therefore, the circumferential covering angle of the permanent magnet in the rotor with which a predetermined driving torque, in that the maximum driving torque is obtained, is definitely determined for the respective rotors concerned.

Figure 11:
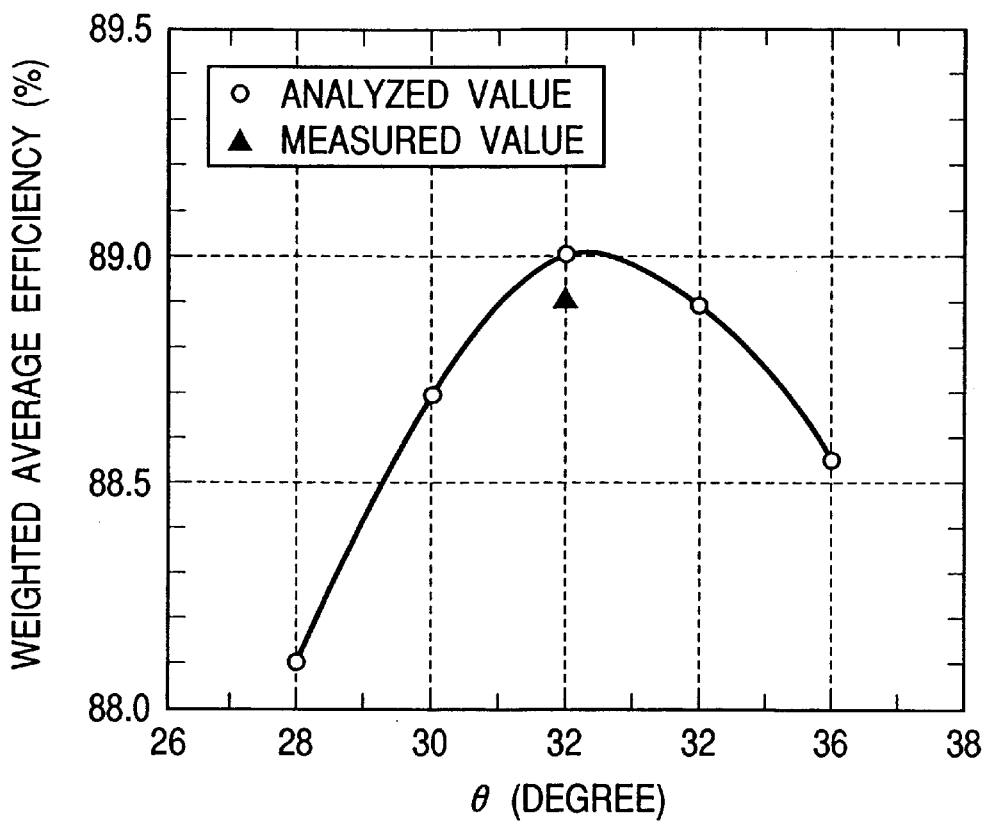
FIG. 11 is a graph illustrating analyzed values of weighted average efficiency (%) in view of the use frequency of the permanent magnet type dynamoelectric machine, including an invertor loss, with respect to variation of angle θ in FIG. 1 permanent magnet type dynamoelectric machine, and a measured value thereof at angle of 32°.

FIG. 11 shows the relationship between angle θ for an 8 pole permanent magnet type dynamoelectric machine of rated output of 50 KW and analyzed values of weighted average efficiency thereof including an invertor loss in view of the use frequency thereof, and a measured value thereof at an angle of 32°.

As seen from FIG. 11, the measured value and the analyzed value of the weighted average efficiency at the angle of 32° are substantially the same, which shows the validity of the present analysis. It will be appreciated from FIG. 11 that the weighted average efficiency is maximized at the angle of 32°. At the same time, it will be understood as explained above that the cogging torque is reduced and the weighted average efficiency is enhanced at the angle θ=32°.

Further, it is advantageous to use the permanent magnet type dynamoelectric machine according to the above embodiment as a driving motor for an electric vehicle.

Figure 12:
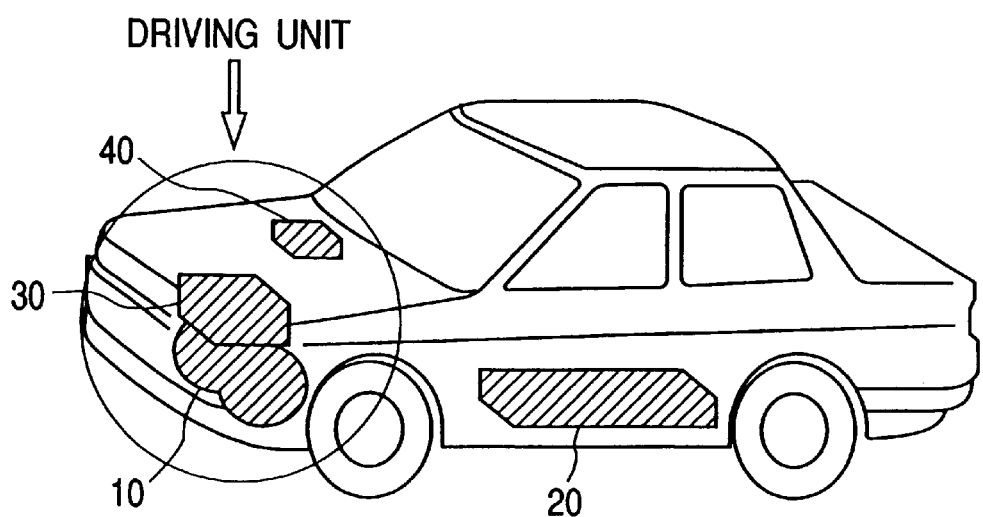
FIG. 12 is a view of an electric car using a permanent magnet type dynamoelectric machine representing a first embodiment according to the present invention.

FIG. 12 shows an example of electric vehicle using a permanent magnet type dynamoelectric machine as the driving motor thereof. As illustrated in FIG. 12, the invertor 30 inverts the DC voltage supplied from a battery 20 into AC voltage, and an electric motor 10 is driven with te AC voltage at a predetermined torque and rpm through a control unit 40.

Since the electric motor 10 is directly coupled with a wheel shaft, if an electric motor having a large cogging torque is used the electric car tends to vibrate during stating and standstill thereof.

Through the use of the permanent magnet type dynamoelectric machine according to the present embodiment, the cogging torque of an electric motor is reduced, without increasing the cost of the electric motor by skewing the permanent magnet or by adding cogging control unit which operates to cancel out induced cogging torque. Through the use of the electric motor according to the present invention, a comfortable electric vehicle with a small vibration during starting and standstill of the vehicle is realized.

Further, in the present invention, the cross section of the permanent magnet is not limited to a rectangle as shown in the first embodiment, but can take a variety of shapes.

Figure 13:
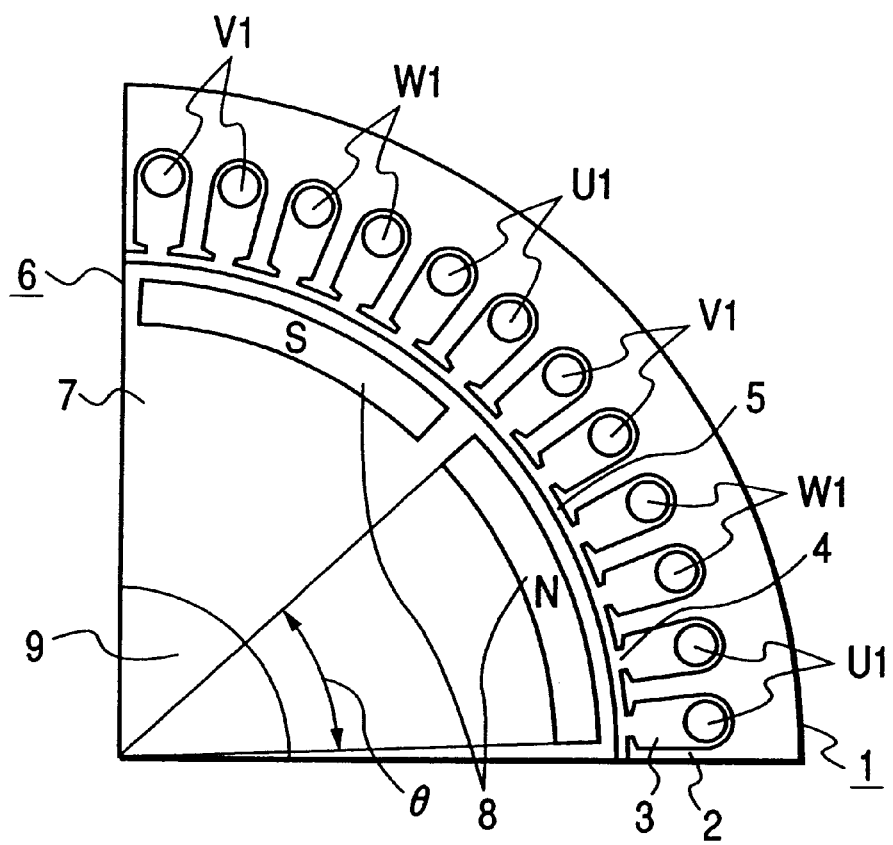
FIG. 13 is a cross sectional view of a quarter of a permanent magnet type dynamoelectric machine representing a second embodiment according to the present invention.

FIG. 13 is a cross sectional view of a quarter of a permanent magnet type dynamoelectric machine representing a second embodiment according to the present invention, wherein each of the permanent magnets 8 is configurated in an arc shape cross section. In the present embodiment, like the first embodiment, the cogging toque caused by the permanent magnet type dynamoelectric machine is reduced by selecting proper angle of θ. In the present embodiment, same reference numerals are used for the same or equivalent members or elements as in the first embodiment.

Still further, permanent magnets 8 other than the neodymium alloy magnet can be used. Also, the number of permanent magnets (in other words number of poles) can be other than 8 and 16 as exemplified above. In addition, the number of slots in the stator can be other than 48 exemplified above. Finally, the application of the present invention is not limited to a rotary dynamoelectric machine such as an inner rotating type and an outer rotating type, but can be applied to a linear motor, when reduction of cogging torque is required.

According to the present invention, the cogging torque can be reduced without skewing already formed permanent magnets; the performance of the permanent magnet type dynamoelectric machine can be enhanced; and the cost thereof is reduced.

Further, through the use of the permanent magnet type dynamoelectric machine according to the present invention for an electric vehicle, the vibration of the electric vehicle during starting and standstill of the vehicle is reduced and the riding comfort can be achieved thereby.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A permanent magnet type dynamoelectric machine comprising:

a stator having a stator iron ore in which a stator winding is wounds;

a rotor having a rotor iron core facing the stator iron core through an air gap, permitting rotation of the rotor; and a plurality of permanent magnets embedded along a circumference of the rotor iron core;

wherein a mechanical angle θ formed by an outer circumferential width of each of said permanent magnets at a side facing said stator, relative to the axial center of said rotor is set as, $$\theta \approx n \times \tau_s + 16/P$$

wherein $\tau_s$ is a slot pitch of said stator in mechanical angle, P is a pole number of the dynamoelectric machine and n is an integer.

2. A permanent magnet type dynamo electric machine according to claim 1, wherein each of said permanent magnets has a rectangular cross section.

3. A permanent magnet type dynamo electric machine according to claim 1, wherein each of said permanent magnets has an arcuate cross section.

4. A permanent magnet type dynamoelectric machine comprising:

a stator having a stator iron core in which a stator winding is wound;

a rotor having a rotor iron core facing the stator iron core through an air gap, permitting rotation of the rotor; and a plurality of permanent magnets embedded along a circumference of the rotor iron core; wherein while being buried therein, characterized in that a mechanical angle θ about an axial center of said rotor, formed by an outer circumferential width of a side of each of said permanent magnets which faces the stator, is set to approximately 32°;

the number of slots of said stator is 48;

a slot pitch of said stator in mechanical angle is 7.5°; and the number of poles of the dynamoelectric machine is 8.

5. An electric vehicle comprising:

a battery for supplying a DC voltage;

an invertor which inverts the supplied DC voltage to an AC voltages; and a permanent magnet type dynamoelectric machine which outputs a driving torque for the electric machine using the inverted AC voltage; wherein the permanent magnet type dynamoelectric machine includes a stator having a stator iron core in which a stator winding is wound, a rotor having a rotor iron core facing the stator iron core through an air gap permitting rotation of the rotor, and a plurality of permanent magnets embedded along a circumference of the rotor iron core a mechanical angle θ formed about an axial center of said rotor, by an outer circumferential width of a side of each of said permanent magnets which faces the stator is set to approximately $$\theta \approx n \times \tau_s + 16/P$$

wherein $\tau_s$ is a slot pitch of said stator in mechanical angle, P is a number of poles of the dynamoelectric machines, and n is an integer, whereby the permanent magnet type dynamoelectric machine outputs a predetermined driving torque and either a wheel or a wheel driving shaft of the electric vehicle is directly driven by the predetermined output driving torque.

* * * * *